United States Patent [19]

Starr

[11] 4,144,045

[45] Mar. 13, 1979

[54] KILN AND METHOD FOR HEATING AND BENDING GLASS SHEETS

[75] Inventor: Eugene W. Starr, Allison Park, Pa.

[73] Assignee: PPG Industries, Inc., Pittsburgh, Pa.

[21] Appl. No.: 895,909

[22] Filed: Apr. 13, 1978

[51] Int. Cl.² ............................................. C03B 23/02
[52] U.S. Cl. ...................................... 65/107; 65/111; 65/162; 65/350; 165/142; 165/174; 432/205
[58] Field of Search .................. 65/106, 107, 111, 162, 65/119, 348, 349, 350, 351; 432/205; 165/142, 174

[56] References Cited

U.S. PATENT DOCUMENTS

| | | | |
|---|---|---|---|
| 2,008,007 | 7/1935 | Dreffein | 65/162 X |
| 2,133,784 | 10/1938 | Merrill | 65/119 |
| 2,218,654 | 10/1940 | Paddock | 65/107 |
| 2,463,996 | 3/1949 | Polk | 165/174 X |
| 3,295,843 | 1/1967 | McMaster et al. | 65/162 X |
| 3,551,130 | 12/1970 | McMaster | 65/351 X |

Primary Examiner—Arthur D. Kellogg
Attorney, Agent, or Firm—Dennis G. Millman; Edward I. Mates

[57] ABSTRACT

Apparatus for thermally treating glass sheets comprising a combustion chamber, a kiln and a hot gas delivery system for delivering a mixture comprising combustion products into the kiln in such a manner as to avoid deviations from a substantially uniform temperature pattern across the kiln suitable for sag bending and annealing glass sheets.

The delivery system comprises a delivery pipe, means for dividing said mixture into two approximately equal flows of said mixture for supplying said flows through a pair of branch pipes, then through the length of a pair of manifolds, each comprising an open ended inner pipe, and a concentric apertured outer pipe. The outer pipes have upwardly directed nozzles of substantially equal cross-section located at approximately uniformly spaced intervals along their length. The mixture flows into the kiln upwardly from said nozzles at a substantially uniform temperature along the length of the outer pipes and blends with the kiln atmosphere to provide a more uniform temperature pattern than is obtained from prior art kiln temperature control systems.

9 Claims, 6 Drawing Figures

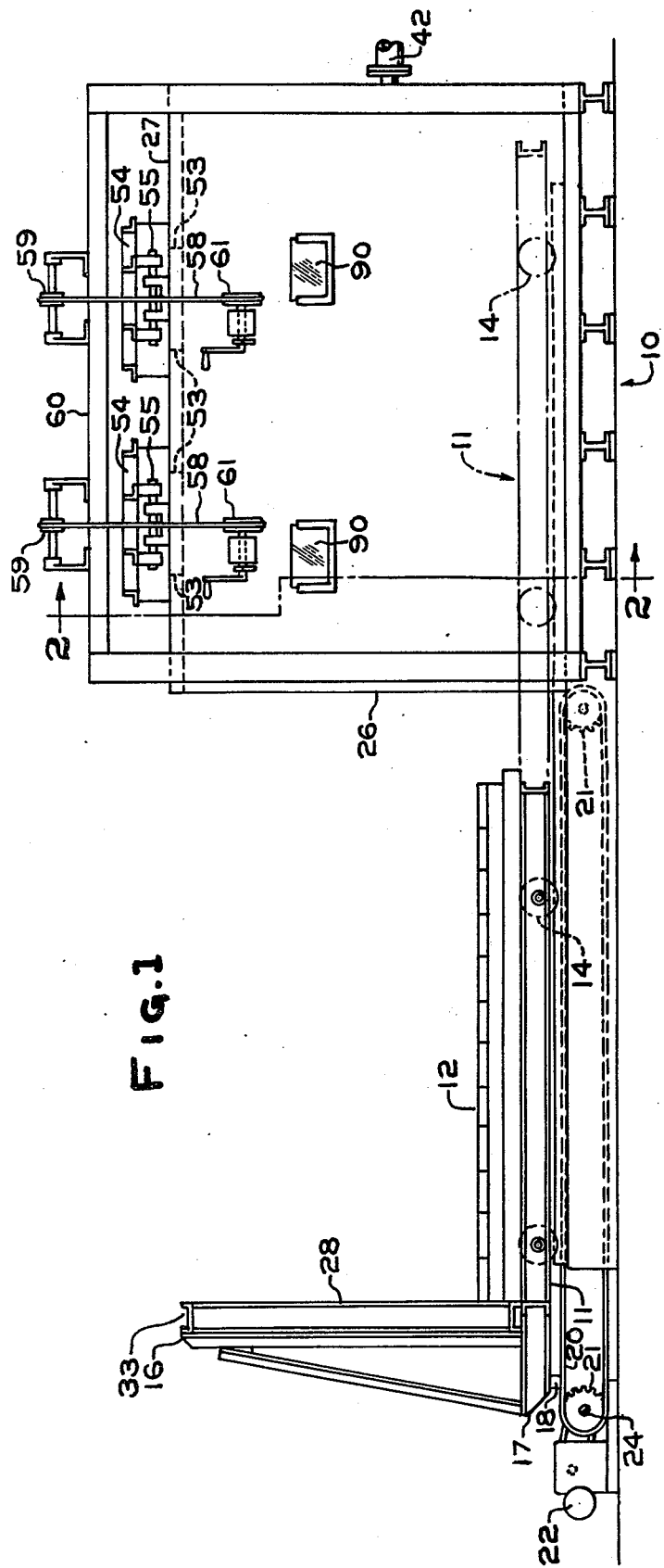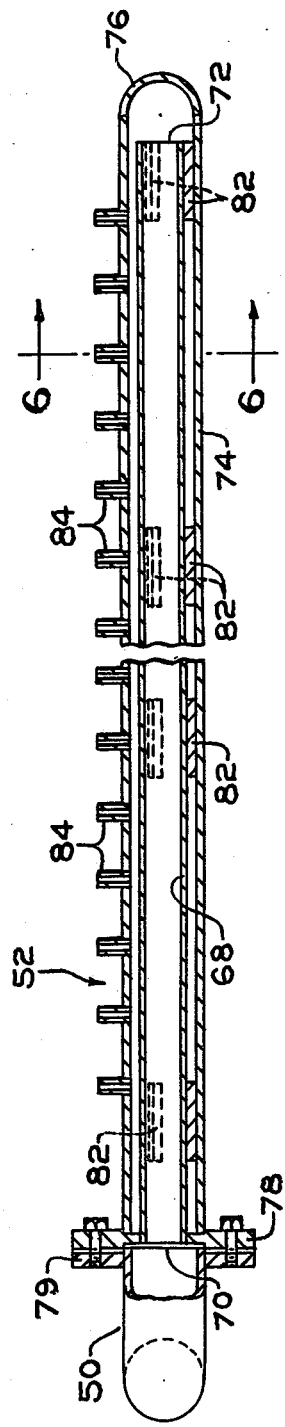

KILN AND METHOD FOR HEATING AND BENDING GLASS SHEETS

BACKGROUND OF THE INVENTION

Glass sheets must be shaped to very exact dimensions when they are used as components of laminated aircraft windows or as pressing plates to press polish acrylic or polycarbonate sheets that are components of aircraft windows to insure that the major surfaces of the acrylic or polycarbonate sheets are smooth and free from wrinkles and other deviations from smoothness, such as extrusion marks that form during their fabrication. It is extremely important that the temperature within a kiln that is used to shape glass sheets be controlled with sufficient precision as to insure that one or more glass sheets stacked on a bending mold are bent to the curvature desired within precise limits of tolerance.

In the bending of such precision parts, it is important to have a uniform temperature within a kiln where a mold laden with one or more glass sheets is located for bending. Otherwise, the viscosity variations resulting from non-uniform heating would cause a deviation from desired shaping of the glass. Since glass sheets are supported in a horizontal plane for shaping by sag bending, it is important that the kiln temperature be substantially uniform from side to side and from end to end of the kiln, particularly at the level in the kiln at which one or more glass sheets are supported for sag bending.

It is also important that the temperature within a kiln be accurately controlled from outside the kiln so as to avoid the need to enter the kiln to change the atmospheric temperature. Some glass thicknesses and some glass shapes require different heating rates than others and it is also necessary to anneal shaped glass after it has been shaped. Thus, it is also important that the kiln be capable of fairly rapid temperature changes without causing a significant departure from substantially uniform temperature conditions throughout the extent of the kiln.

It is also important from the point of view of safety that the kiln in which glass sheets are bent be free of flames. Hot products of combustion that are completely burned in a combustion chamber outside the kiln are safer to handle within an enclosed kiln than open flames. Also, it is easier to obtain a more uniform horizontal temperature pattern with a gas delivery system that delivers a gas mixture containing combustion products than with a gas delivery system that delivers burning flames.

DESCRIPTION OF THE PRIOR ART

U.S. Pat. No. 2,130,420 to Ferree discloses in a furnace for producing forged steel rolls a pair of nozzled gas supply pipes near each side wall extending along the length of the furnace. The burners are supplied with combustible gas mixture at a pressure such that blue flames project from the nozzles of about 2-3 inches in length. Such flames within a furnace cannot be controlled unless access is obtained to within the furnace.

U.S. Pat. No. 2,213,406 to Paddock et al., U.S. Pat. No. 2,218,654 to Paddock and U.S. Pat. No. 2,392,770 to Ryan and Zolman heat a glass bending lehr with multiple pipes extending through the bottom portions of the side walls of the lehr to supply gas flames directed to narrow vertical channels to a curved crown of the lehr to heat the lehr. Each feed pipe must be correlated with each other feed pipe to obtain a uniform temperature along the length of the vertical channels.

U.S. Pat. No. 2,223,124 to Owen supplies hot gas followed by cold air to opposite surfaces of a glass sheet to be bent and tempered through apertured plates and chambers.

U.S. Pat. No. 2,255,617 to Hoak discloses an annealing apparatus provided with burner pipes or nozzles having upturned ends so that flames introduced into the apparatus will not impinge directly against the vertical walls of combustion chambers. A valve controls the supply of fuel to each burner so that each burner can be controlled individually.

U.S. Pat. No. 2,754,628 to Dawe discloses a furnace for heat treating conically shaped television tubes where means is provided to avoid cooling the thinner neck portions of the tubes more rapidly than their thicker or screen portion.

U.S. Pat. No. 3,298,810 to McKelvey supplies combustion products under pressure to a glass sheet mounted on an outline mold preparatory to tempering. The hot combustion products are supplied through a box having upwardly facing nozzle openings against the bottom surface of a glass sheet.

U.S. Pat. No. 3,431,095 to Ross discloses the use of a blower to control the temperature gradient of a hot atmosphere in a glass sheet bending lehr and to deliver hot gas against glass sheets in the preheat portion of a bending lehr.

U.S. Pat. No. 3,529,947 to Frank discloses fluid supply means to deliver hot gas to a pair of apertured press bending molds and independent fluid supply means to deliver cold air to said apertured press bending molds.

U.S. Pat. No. 3,844,757 to Kaufman and Bienenfeld discloses a dynamic high volume hot gas flowing system that impinges heated gas at an acute angle in a downward direction against a vertically suspended glass sheet to produce uniform heating of even the largest of glass sheets. A plurality of distribution ducts are provided to supply the hot gas through a series of oblique nozzles. This system requires a very high volume of flow and is limited to handling flat sheets of glass that are suspended vertically and requires an exchange rate of 100 to 400 volumes per minute.

The art of bending and annealing glass sheets was still looking for a special glass sheet bending and annealing kiln that developed a substantially uniform temperature from side to side and front to rear of the kiln without requiring individual pipe flame controls within the kiln or a high volume gas supply operation that consumes much power.

SUMMARY OF THE INVENTION

The present invention provides a more uniform horizontal temperature profile at any horizontal plane in the kiln by providing a source of hot combustion products outside the kiln, an insulated delivery pipe exterior to the kiln to deliver hot combustion products from said source to within said kiln and communicating with an interior delivery pipe located within said kiln at approximately the transverse center thereof. Mixtures containing hot combustion products are divided into two substantially equal flows of hot gases at a T-connection for delivery to a pair of transverse branch pipes extending in opposite directions from the T-connection toward the opposite side walls of the kiln. The end of each branch pipe remote from the T-connection communicates with one end of a manifold. The manifolds are identical to one another and extend parallel to one another adjacent the floor of the kiln and adjacent and parallel to the opposite side walls of the kiln. The pipes and manifolds form a system of restricted gas flows.

Approximately equal flows of mixtures containing combustion products arrive at the junction of each branch pipe and each manifold at approximately equal temperatures. The manifolds are of special construction and each comprises an inner closed pipe having one end communicating with a branch pipe and a closed-end outer pipe spaced from the inner pipe so that the end of each inner pipe remote from its associated branch pipe communicates with the outer pipe. A plurality of upwardly directed nozzles spaced substantially equally from one another along the length of the outer pipe extend from the outer pipe of the manifold. The pipes of the manifold are constructed of metal so that there is good heat exchange between the inner and outer pipes. Hence, the hot combustion products, which tend to cool as they traverse the pipe system within the kiln, become exposed to the temperature gradient along the length of the inner pipe of the manifold as they reverse direction along the outer pipe of the manifold. Hence, the combustion products leave the nozzles along the length of the outer pipe at a substantially uniform temperature along the length of the pipe.

The upward flow of combustion products from the length of both manifolds develops a vertical temperature gradient within the kiln, but there is very little temperature gradient from side to side or from front to rear at any given horizontal plane. Since glass sheets are supported in a horizontal plane for bending and annealing in the kiln, the low horizontal temperature gradient that results from the delivery system of this invention provides a kiln atmosphere that is adequate for shaping horizontally supported glass sheets. Furthermore, when shaping by gravity sagging is completed and it is necessary to cool the atmosphere within the enclosed kiln, the gas delivery system of the present invention is also suitable to provide a low horizontal temperature gradient from side to side and from front to rear of the kiln as the bent glass is controllably cooled during an annealing operation that follows the bending operation.

These and other advantages of the present invention will become obvious in the light of a description of an illustrative embodiment thereof that follows.

BRIEF DESCRIPTION OF THE DRAWINGS

In the drawings which form part of a description of an illustrative embodiment of the present invention, FIG. 1 is a longitudinal elevational view of a kiln with a door and platform shown in the open position for mounting a bending mold on the platform;

FIG. 5 is an enlarged sectional view of a manifold forming part of the delivery system of hot combustion products.

DESCRIPTION OF A PREFERRED EMBODIMENT

Figure 3:
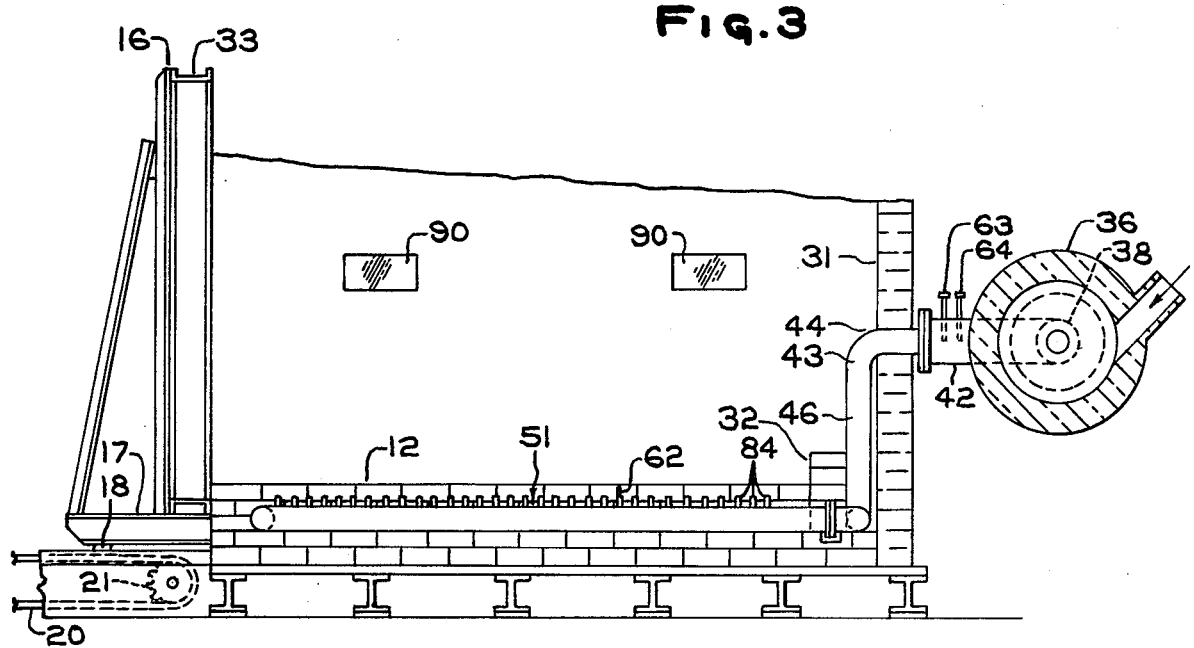
FIG. 3 is a fragmentary longitudinal sectional view taken along the lines 3—3 of FIG. 2.
Figure 4:
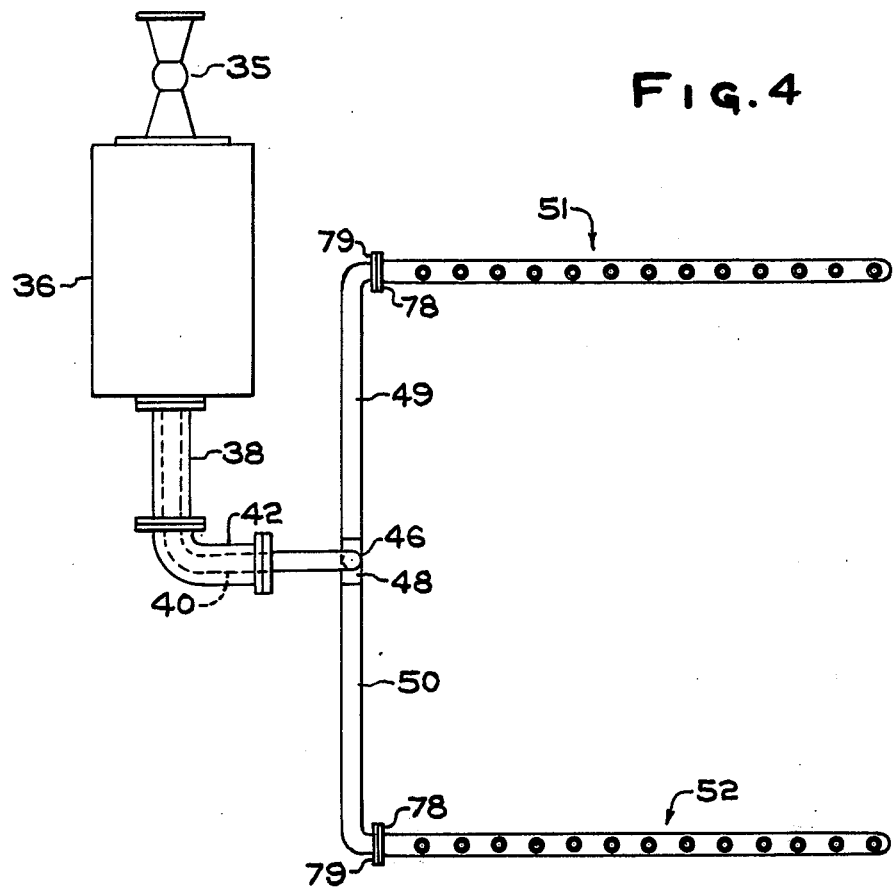
FIG. 4 is a plan view of a delivery system for delivering hot combustion products to the kiln of FIG. 1 along restricted paths of flow.

A preferred embodiment of the present invention comprises a kiln 10 and a carriage 11 movable between a loading and unloading position outside the kiln 10 such as depicted in FIG. 1 and a position within the kiln 10 (see FIG. 3) wherein one or more glass sheets can be bent to the shape of a gravity sag bending mold (not shown). Carriage 11 comprises a horizontal platform 12 mounted on wheels 14 and a vertical door 16. The platform 12 comprises a layer of brick mounted on a metal support plate. The door 16 is fixed to a horizontal extension 17 that supports the door 16 and also supports a lug 18 that extends downward from the horizontal extension 17. Lug 18 is connected to a link of a drive chain 20 interconnected between sprockets 21. The latter are connected to a drive motor 22 through reduction gearing and a drive shaft. The carriage 11 is guided to move along a pair of tracks comprising an inverted V-shaped track 23 and a flat track 24. Wheels of corresponding cross section are provided for the carriage. This track system permits lateral expansion of the carriage due to changes in temperature. The sides of the carriage 11 slide along sand seals 25 which insulate the bottom of the carriage from the hot atmosphere of the kiln.

The kiln 10 comprises a reinforced metal shell 26 whose interior is lined with blocks of an alumino-silica fiber in block form comprising a square array of ceramic fiber strips bonded to an expanded metal substrate and fastened together by grout and a hidden metal fastener. Such blocks sold under the trademark PYRO-BLOC® provide a soft ceramic fiber lining 28 for the roof 27, a pair of side walls 29 and 30 of the kiln and an end wall 31 of the kiln. An abutment 32 of ceramic block is provided for engagement by the leading end of the carriage 11 when the latter is located within the kiln 10 for a bending operation. A similar lining 28 is provided for the door 16 within a reinforced metal structure 33 for the door. The fibrous block provides a lightweight, soft ceramic fibrous lining in block form that meets the test for protection of a furnace shell against continuous temperatures up to 2500° F. (1371° C.). At an operating temperature of 1200° F. (649° C.) and with an outside temperature of 120° F. (49° C.), a kiln ten feet square (3 meters square) and six feet (1.8 meters) high has a heat loss rating of 96 Btu/sq. ft./hr. (293 watts/square meter/hour) and a heat storage rating of 424 Btu/sq. ft. (1.33 Kilowatts/square meter). The reinforced metal structure 33 of the door has apertures that are aligned with apertures in the end portion of the reinforced metal shell 26 of the side walls 29 and 30 of kiln 10 to enable the door 16 to be locked in abutting relationship against the ends of the side walls 29 and 30 of the kiln 10 to provide an enclosed chamber.

Figure 2:
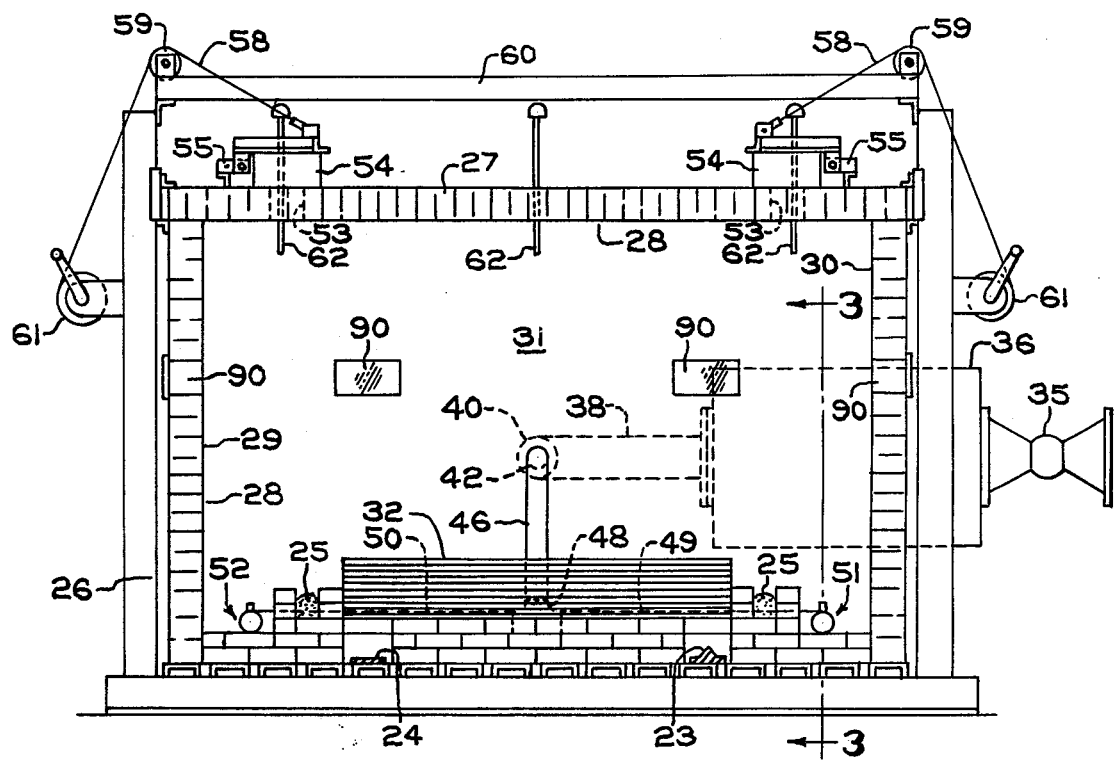
FIG. 2 is a sectional view taken along the lines 2—2 of FIG. 1.

Heat for use in the kiln 10 is provided by a multi-fuel burner 35, preferably a "Blue Flame" burner model B010, sold by the Blue Flame Division of U.E. Corporation, Ringoes, N.J. The burner 35 communicates with a refractory lined combustion chamber 36 which is also selectively fed air from a blower to moderate and control the temperature of the combustion products that leave the combustion chamber 36. Combustion products mixed with moderating air are supplied at a controlled temperature from the combustion chamber 36 through an insulated extension adaptor 38 and an insulated elbow 40 to an insulated exterior delivery pipe 42. The latter communicates with an elbow 43 that extends through an aperture 44 in the lateral central portion of the end wall 31. Interior of the kiln 10, elbow 43 is turned downward to form a vertically extending interior delivery pipe 46 which terminates at its lower end in a T-connection 48 (FIG. 2). The latter is located near the floor of the kiln and at the transverse center line of the kiln. A pair of branch pipes 49 and 50 extend in opposite directions from the T-connection 48 and are the mirror images of one another so as to divide the flow of hot gaseous products that arrive at the T-connection 48 into two substantially equal flows. Branch pipe 49 extends toward side wall 30 and branch pipe 50 extends toward side wall 29 of the kiln 10. The end of branch pipe 49 remote from T-connection 48 connects with a manifold 51 extending along the length of the kiln adjacent the lower part of side wall 30. Branch pipe 50 connects with a second manifold 52 that extends parallel to manifold 51 along the length of the furnace adjacent the lower part of the side wall 29 of the kiln 10. Approximately equal volumes of hot gaseous products are delivered to each manifold at approximately equal temperatures through flows restricted from the kiln atmosphere.

The details of the manifold will be described later.

The roof 27 of the kiln has a number of apertures 53, each of which may be closed or opened as desired by metal reinforced ceramic dampers 54. Each of the latter is pivotally supported relative to a pivotal support 55 mounted on the roof 27 of the kiln. To accomplish this end, a cable 58 is attached to each damper 54 and is entrained about a pulley 59. The latter is supported on a superstructure 60 for the kiln 10. A cam controlled adjustment pulley 61 is fixed to the free end of each cable 58 to adjust the amount of the opening for each damper 54.

A number of thermocouples 62 extend through stretegic locations in the furnace roof. A suitable control arrangement comprises one thermocouple 62 at the geometric center of the kiln roof and four additional thermocouples disposed adjacent each of the four corners of the roof 27. The reinforcing superstructure 60 supports the thermocouples 62. The thermocouples provide satisfactory monitoring of the environmental temperature within the kiln. The center of the roof may also support a pyrometer (not shown) that sights vertically downward on a glass sheet undergoing bending. Usually, the pyrometer is only used when the glass temperature is expected to exceed 800° F. (427° C.). Additional thermocouples 62 are provided in each manifold 51 and 52 and a high temperature limit thermocouple 63 and a temperature control thermocouple 64 are provided in exterior delivery pipe 42. Thermocouple 63 shuts off the burner 35 when it monitors a temperature exceeding a preset setting and also sounds an alarm. Thermocouple 64 is coupled to a temperature control system that is controlled by a Trend Trak Programmer sold by Leeds and Northrup Company, North Wales, Pennsylvania. The programmer controls the rate of supplying fuel and air according to a preset ratio to the burner in responses to temperature changes monitored by thermocouple 64. Since this system is available commercially and forms no part of the present invention, it is not described in detail. The present invention is concerned with temperature uniformity within a convective heating kiln regardless of the temperature at which combustion products are delivered to the kiln.

Figure 6:
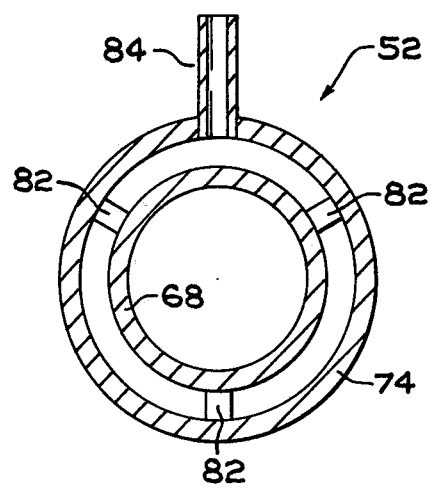
FIG. 6 is an enlarged cross-sectional view taken along the lines 6—6 of FIG. 5 of a single manifold constructed according to the present invention.

An important feature of the present invention is the specific construction of the manifolds 51 and 52. The specific construction to be described promotes more uniform temperature along the length of the manifolds than is possible with single pipe manifolds used in the prior art. Referring to FIGS. 5 and 6, each manifold 51 and 52 comprises an inner pipe 68 having a first opening 70 at one end that communicates with either branch pipe 49 or 50. A second opening 72 is provided for each inner pipe 68 at the opposite longitudinal end thereof. An outer pipe 74 having a rounded closed end 76 adjacent the second opening 72 and terminating at a flanged member 78 adjacent the first opening 70 is concentrically mounted around the inner pipe 68. Each branch pipe 49 and 50 terminates in a flanged member 79 that mates with the flanged member 78 of a corresponding outer pipe 74 to help provide a rigid connection between each manifold 51 and 52 and its respective branch pipe 49 and 50. A plurality of spacers 82 of 309 or 310 stainless steel about ¼ inch (6 mm) square in cross section and about 4 inches (10 cm) long are intermittently placed about one foot apart at 120° circumferential spacing along the length of the manifold between the inner pipe 68 and the outer pipe 74.

The inner pipe 68 is preferably of two inch diameter schedule 40, type 446 stainless steel and the outer pipe 74 is preferably of 3 inch diameter schedule 40, type 446 stainless steel. The upward facing wall of each of the outer pipes 74 is provided with ⅛ inch schedule 40 pipe nozzles of type 310 stainless steel at 2⅞ inch (7.3 cm) spacing between nozzles. The nozzles extend upward 1¼ inch (3.2 cm) and have an inner diameter of 0.269 inch (0.683 cm) and an outer diameter of 0.405 inch (1.029 cm).

The combustion chamber 36 and the extension adaptor 38, the elbow 40 and the exterior delivery pipe 42 outside the furnace are lined with refractory and ceramic insulation to minimize cooling of the hot gases supplied to the kiln via the restricted paths of flow within the kiln formed by the elbow 43, the interior delivery pipe 46, the T-connection 48, the branch pipes 49 and 50 and the manifolds 51 and 52 comprising the length of the inner pipes 68 and their return run through the exterior pipes 74, thence through the nozzles 84 to the kiln chamber.

It is believed that the reason why this supply system provides a more uniform kiln temperature than a pair of single pipe manifolds located in the same positions as manifolds 51 and 52 is that the mixture of air and combustion products tends to lose temperature as it moves along the length of the inner pipe 68. On the return run through outer pipe 74, the mixture "sees" a gradually increasing metal temperature of the inner pipe 68. Since the mixture tends to cool as it continues to flow, its exposure to the temperature gradient of the inner pipe tends to compensate for further cooling so that the mixture on leaving the nozzles 84 has a more uniform temperature along the length of the outer pipe 74 than would be the case if the direction of flow were not reversed before exposure to the interior of the kiln 10.

More than 100 different patterns have been bent using the kiln provided with the combustion products distributor system disclosed herein. The procedure usually followed was to load one or more glass sheets on a bending mold having an upward facing surface conforming to the shape desired for the bent glass. The mold is usually of an outline skeleton structure provided with runners that are supported on ceramic blocks to space the runners vertically above the horizontal platform 12 of carriage 11. After loading the glass laden mold on the platform, carriage 11 and door 16 is moved within the kiln 10 to provide a closed chamber. The combustion burner 35 is ignited and heat-up of the kiln begins. Windows 90 are provided in the side walls 29 and 30 and end wall 31 and door 16 so that operators can observe the progress of the bend. As soon as the glass conforms to the shaping surface of the mold, the kiln and glass temperatures were rapidly lowered by cutting back on the heat output of the combustion chamber 36 and/or shutting off burner 35. Sometimes this was accompanied by opening the roof dampers 54. Combustion blow air is also sometimes used during the rapid heat cut-back required for annealing. The bent glass parts were rapidly cooled to below the glass deformation temperature in 3 to 5 minutes, then held at a set temperature within the range of 850° F. (454° C.) to 950° F. (482° C.) for a specified time, usually between 30 and 60 minutes, after which a cool-down cycle of a pre-arranged program of cooling conducive to proper annealing is carried out.

EXAMPLE

Typical temperature studies have been made by monitoring five thermocouples extending from the roof of the kiln near the four corners of the kiln, namely TC #1 near the left side corner of the end wall, TC #2 near the right side corner of the end wall, TC #3 near the left side corner of the door, TC #4 near the right side corner of the door and TC #5 at the geometric center of the closed kiln. The glass temperature measured by a pyrometer adjacent thermocouple TC #5 is also recorded.

EXAMPLE I

Two glass sheets 14 inches by 35 inches by 0.070 inches were loaded on a mold and the kiln was closed at 7:10 AM. Temperatures recorded in degrees Fahrenheit at various times during the temperature cycle are recorded in Table I.

TABLE I

| Time | Pyro-meter | TC#1 | TC#2 | TC#3 | TC#4 | TC#5 |
|---|---|---|---|---|---|---|
| 8:00 AM | — | 660 | 660 | 660 | 660 | 660 |
| 8:30 AM | — | — | — | — | — | 750 |
| 9:00 AM | — | 880 | 878 | 875 | 882 | 878 |
| 9:30 AM | 964 | 968 | 963 | 900 | 968 | 964 |
| 10:00 AM | 1015 | 1020 | 1018 | 1010 | 1020 | 1018 |
| 10:30 AM | 1065 | 1065 | 1062 | 1050 | 1065 | 1062 |
| 11:00 AM | 1110 | 1108 | 1105 | 1102 | 1105 | 1104 |
| Noon | 1172 | 1178 | 1175 | 1170 | 1178 | 1175 |
| 1:00 PM | 1220 | 1230 | 1230 | 1230 | 1235 | 1230 |
| 1:30 PM | 1150 | 1142 | 1145 | 1140 | 1145 | 1145 |

The front to rear temperature profile from the end wall to the door of the kiln did not vary by more than 10° F. during this run and the side to side temperature profile from side wall to side wall of the kiln did not vary by more than 10° F. during this run. In addition, the maximum variation of any of the corner values from the temperature measurement at the center of the kiln was 8° F. Thus, the temperature variation parallel to the length of the manifolds did not differ from the temperature variation across the width of the kiln normal to the length of the manifolds.

Typical temperature variations of 20° F. from side to side or from front to rear of a kiln before installing the double pipe manifolds of the present invention were not unusual. In addition, experience has shown that supplying combustion products to a single pipe manifold provided with nozzles every half inch provided nozzle temperatures that dropped from 2100° F. to 1510° F. over a length of eleven feet. It would be impossible to obtain the temperature uniformity experienced in the Example if a pair of single pipe manifolds were used instead of the double pipe manifold pair of the present invention.

The form of this invention shown and described herein represents an illustrative preferred embodiment thereof. It is understood that various changes may be made without departing from the gist of the invention as defined in the claimed subject matter which follows.

I claim:

1. Apparatus for bending and annealing glass sheets comprising an enclosed kiln comprising a floor, a roof, a front wall, a rear wall and two side walls of refractory material, a source of hot gas exterior to said kiln, gas delivery means for delivering gas from said source to within said kiln under pressure, said gas delivery means comprising an insulated delivery pipe communicating from said source and extending through said rear wall, an interior delivery pipe within said kiln communicating at one end with said insulated delivery pipe, a T-connection communicating with the other end of said interior delivery pipe, a pair of branch pipes, one of said pair extending transversely in one direction from said T-connection and the other of said pair extending transversely in a direction opposite said one direction from said T-connection, a manifold connected to the end of each of said branch pipes and extending substantially the entire length of said enclosed kiln, means to support each manifold adjacent said floor, one of said manifolds being located adjacent one of said side walls and the other of said manifolds being located adjacent the other of said side walls, each of said manifolds comprising an inner pipe and an outer pipe supported in approximately concentric relation, the inner pipe having open ends and the outer pipe having closed ends, the inner pipe communicating with an end of one of said branch pipes at one end thereof and communicating with the outer pipe of said manifold at the other end thereof, and a plurality of nozzles extending upward from each of said outer pipes to provide a system for supplying gas at a substantially uniform controlled temperature within said kiln through restricted paths comprising said delivery pipe, said T-connection, said branch pipes, said inner pipes and said outer pipes through said nozzles into the interior of said chamber.

2. Apparatus as in claim 1, wherein said nozzles are approximately equally spaced along the length of said outer pipes.

3. Apparatus as in claim 1, wherein said nozzles have approximately equal diameters.

4. Apparatus as in claim 1, wherein each of said nozzles extends vertically upward from an opening therefor in said outer pipe.

5. Apparatus as in claim 1, further including spaced reinforcing means longitudinally spaced along the length of each of said manifold between said inner pipes and said outer pipes and spacing said inner and outer pipes uniformly from one another along their length.

6. Apparatus as in claim 1, further including temperature sensing means and means to control the temperature of hot gases supplied to said delivery pipe in response to the temperature recorded by said temperature sensing means.

7. A method of controlling the temperature pattern within a kiln for thermally treating glass sheets having an end wall and a pair of opposite side walls comprising supplying a flow of a gaseous mixture containing combustion products at a higher temperature than the initial temperature within the kiln from a source of said gaseous mixture located outside said kiln along a restricted passage of flow through the transverse central portion of said end wall of said kiln, dividing said flow into two approximately equal, diverging, restricted flows toward said opposite side walls of said kiln, turning each of said diverging flows into parallel restricted flows extending parallel to and adjacent the bottom portions of said opposite side walls along substantially the entire length of said side walls, reversing the direction of said restricted flows near the end of said side walls, releasing said gaseous flows from said reversed restricted flows into said kiln, and continuing to supply said flow until a glass sheet mounted on a mold within said kiln has sagged into conformity with a shaping surface on said mold.

8. A method as in claim 7, further including the step of supplying a flow of a gaseous mixture having a lower temperature than said first gaseous mixture after said glass sheet has sagged into conformity with said shaping surface.

9. A method as in claims 7 or 8, wherein said gaseous flows are released upwardly from a plurality of substantially equally spaced locations along said reversed restricted flows.

* * * * *